(12) United States Patent
Hong

(10) Patent No.: US 6,963,485 B2
(45) Date of Patent: Nov. 8, 2005

(54) PORTABLE COMPUTER

(75) Inventor: Seung-man Hong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 23 days.

(21) Appl. No.: 10/414,234

(22) Filed: Apr. 16, 2003

(65) Prior Publication Data

US 2004/0066614 A1 Apr. 8, 2004

(30) Foreign Application Priority Data

Oct. 2, 2002 (KR) ................................ 10-2002-0060213

(51) Int. Cl.⁷ ................................................ G06F 1/16
(52) U.S. Cl. ..................................... 361/683; 248/917
(58) Field of Search ............................. 361/681–683, 361/686; 248/917–924; 312/223.1, 223.2

(56) References Cited

U.S. PATENT DOCUMENTS

| | | | | |
|---|---|---|---|---|
| 5,206,790 A | * | 4/1993 | Thomas et al. | 361/681 |
| 5,335,142 A | * | 8/1994 | Anderson | 361/681 |
| 6,061,104 A | * | 5/2000 | Evanicky et al. | 248/921 |
| 6,275,376 B1 | * | 8/2001 | Moon | 361/683 |
| 6,522,530 B2 | * | 2/2003 | Bang | 361/681 |
| 6,587,333 B2 | * | 7/2003 | Tseng et al. | 361/681 |

FOREIGN PATENT DOCUMENTS

| | | |
|---|---|---|
| JP | 3-50205 | 3/1991 |
| JP | 3-161816 | 7/1991 |
| JP | 5-23226 | 2/1993 |
| JP | 5-43219 | 2/1993 |
| JP | 6-19017 | 1/1994 |
| JP | 7-325644 | 12/1995 |
| JP | 10-126068 | 5/1998 |
| KR | 1998-35691 | 9/1998 |

* cited by examiner

Primary Examiner—Lisa Lea-Edmonds
(74) Attorney, Agent, or Firm—Staas & Halsey LLP

(57) ABSTRACT

A portable computer having a main body and a monitor coupled to the main body, by way of a pivoting link having a first end rotatably combined to the monitor so as to tilt and swivel the monitor relative to the main body, and a second end rotatably combined to the main body so as to pivot the monitor relative to the main body. With this configuration, the present invention provides a portable computer in which the monitor can be tilted, swiveled and pivoted relative to the main body, thereby allowing a user to view the monitor from various angles without moving the whole portable computer.

27 Claims, 7 Drawing Sheets

United States Patent US 6,963,485 B2

PORTABLE COMPUTER

CROSS-REFERENCE TO RELATED APPLICATIONS

This application claims the benefit of Korean Application No. 2002-60213, filed Oct. 2, 2002, in the Korean Intellectual Property Office, the disclosure of which is incorporated herein by reference.

BACKGROUND OF THE INVENTION

1. Field of the Invention

The present invention relates to a portable computer, and more particularly, to a portable computer comprising a main body and a monitor coupled to the main body.

2. Description of the Related Art

Generally, a portable computer comprises a monitor having a display panel such as an LCD (liquid crystal display) panel, a main body coupled with the monitor and mounted with a plurality of hardware components. Herein, the portable computer includes a laptop computer, a notebook computer, etc.

A conventional portable computer, as shown in FIG. 1, comprises a main body 110 provided with an input unit such as a keyboard 112, and a monitor 120 tiltable forward and backward relative to the main body 110 and displaying a picture.

However, the monitor 120 of the conventional portable computer can be tilted relative to the main body 110 only in a direction of rotation "A", so that it is inconvenient for a user to view the monitor from various angles.

SUMMARY OF THE INVENTION

Accordingly, it is an aspect of the present invention to provide a portable computer in which a monitor can be easily tilted, swiveled and pivoted relative to a main body.

Additional aspects and advantages of the invention will be set forth in part in the description which follows and, in part, will be obvious from the description, or may be learned by practice of the invention.

The foregoing and/or other aspects of the present invention are achieved by providing a portable computer having a main body and a monitor coupled to the main body, comprising a pivoting link having a first end rotatably combined to the monitor so as to tilt and swivel the monitor relative to the main body, and a second end rotatably combined to the main body so as to pivot the monitor relative to the main body.

According to an aspect of the invention, the portable computer further comprises a tilting link having a first end rotatably combined to the monitor so as to swivel the monitor relative to the main body, and a second end rotatably combined to the main body so as to tilt the monitor relative to the main body.

According to an aspect of the invention, the portable computer further comprises a monitor bracket having a first end combined to the monitor, and a second end swivelably combined to the first end of the tilting link.

According to an aspect of the invention, the portable computer further comprises a main body bracket having a first end combined to the main body, and a second end pivotably combined to the second end of the pivoting link.

According to an aspect of the invention, the portable computer further comprises a swiveling hinge provided between the monitor bracket and the tilting link, and allowing the monitor to swivel relative to the main body.

According to an aspect of the invention, the portable computer further comprises a tilting hinge provided between the tilting link and the pivoting link, and allowing the monitor to tilt relative to the main body.

According to an aspect of the invention, the portable computer further comprises a pivoting hinge provided between the pivoting link and the main bracket, and allowing the monitor to pivot relative to the main body.

According to an aspect of the invention, the portable computer further comprises a cable to electrically connect the main body and the monitor, the cable being accommodated in the main bracket, the pivoting link, the tilting link and the monitor bracket.

BRIEF DESCRIPTION OF THE DRAWINGS

These and other objects and advantages of the present invention will become more apparent and more readily appreciated from the following description of the embodiments, taken in conjunction with the accompanying drawings of which.

DETAILED DESCRIPTION OF THE PREFERRED EMBODIMENTS

Figure 1:
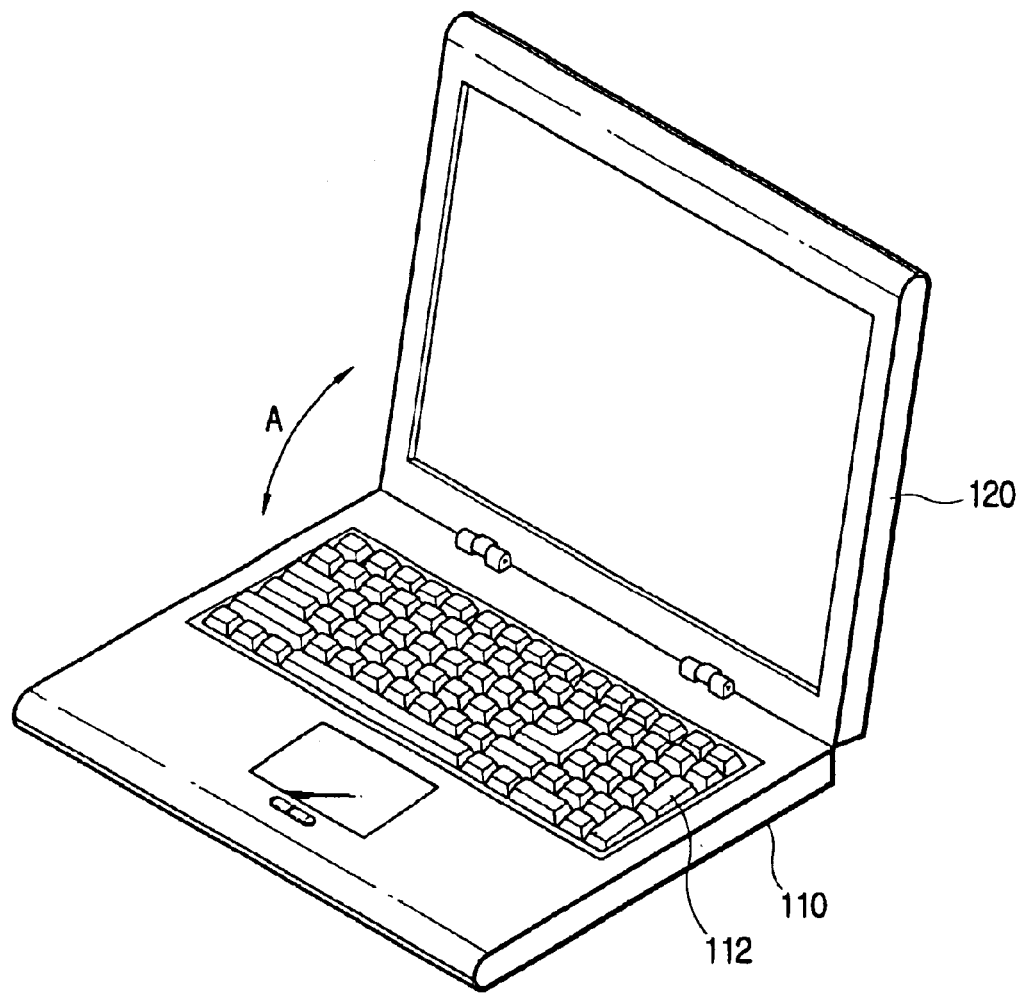
FIG. 1 is a perspective view of a conventional portable computer.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

Figure 2:
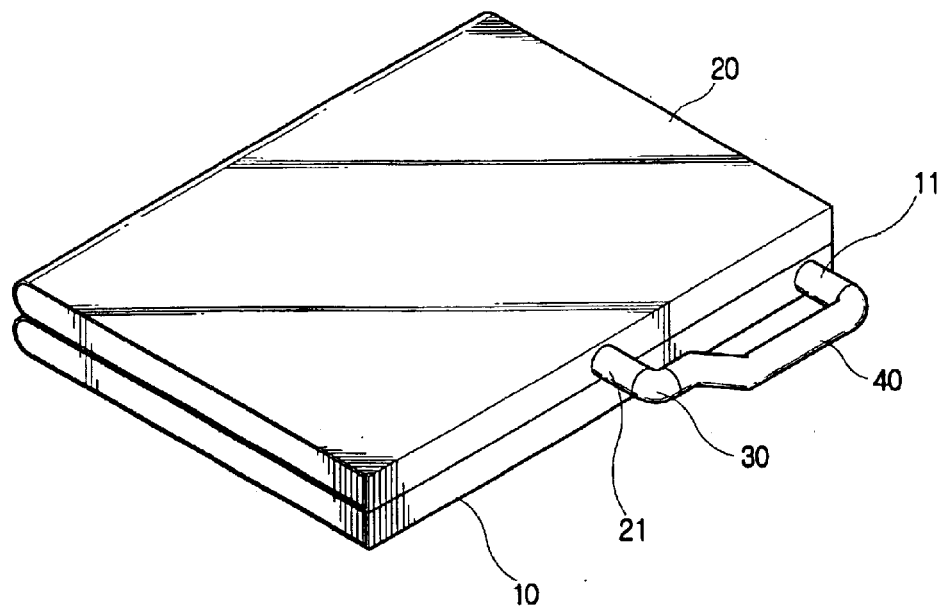
FIG. 2 is a rear perspective view of a portable computer according to a first embodiment of the present invention.
Figure 3:
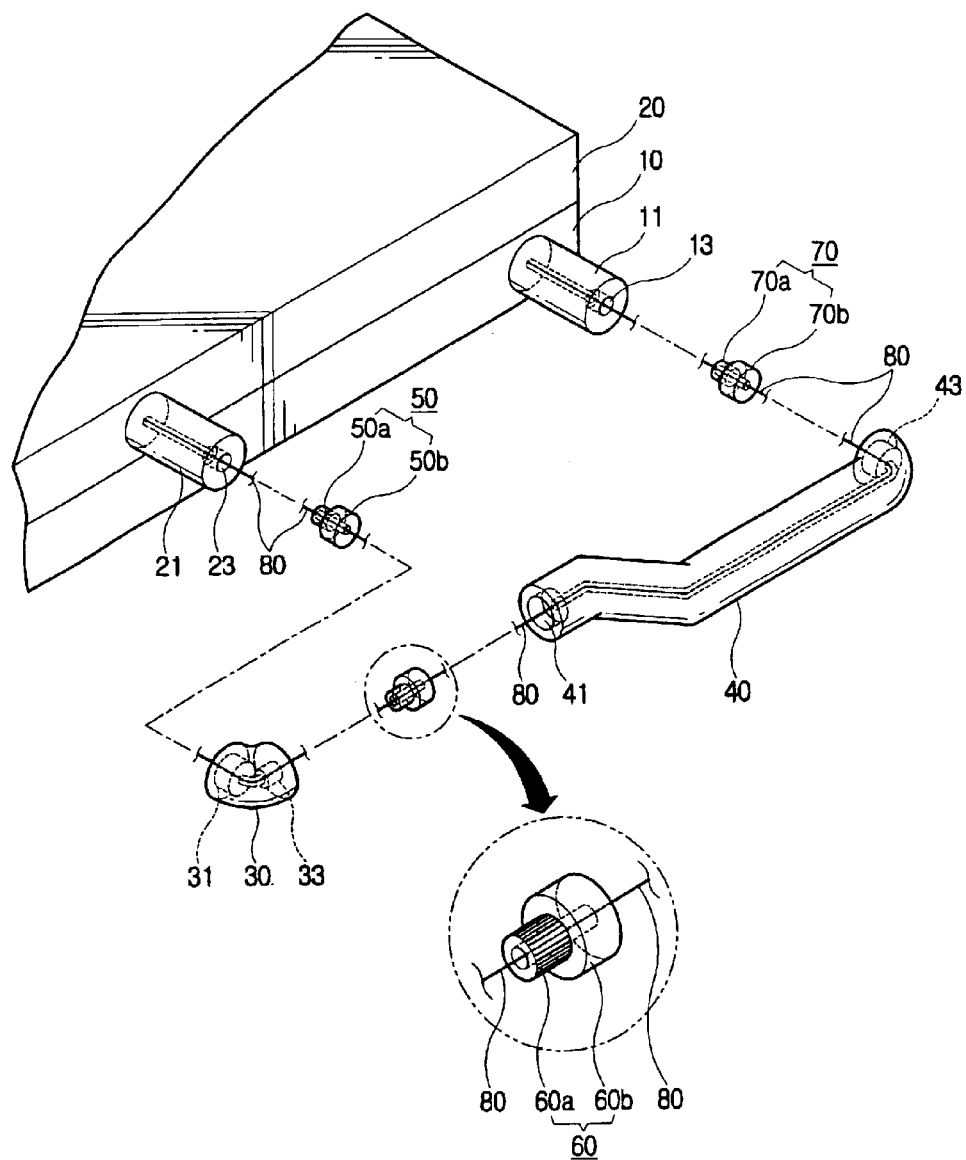
FIG. 3 is an exploded perspective view of the portable computer of FIG. 2.

FIGS. 2 and 3 are perspective and exploded views of a portable computer according to a first embodiment of the present invention, respectively. As shown therein, a portable computer according to a first embodiment of the present invention has a main body 10 which may house a plurality of hardware components such as an input unit, a monitor 20 coupled with the main body 10 and displaying a picture, a monitor bracket 21 having a first end combined to the rear of the main body 10, a tilting link 30 having a first end rotatably combined to a second end of the monitor bracket 21, and allowing the monitor 20 to swivel relative to the main body 10, a pivoting link 40 having a first end rotatably combined to a second end of the tilting link 30, and allowing the monitor 20 to tilt relative to the main body 10, and a main body bracket 11 having a first end combined to the rear of the main body 10 and a second end rotatably combined to a second end of the pivoting link 40, and allowing the monitor 20 to pivot relative to the main body 10.

The first end of the monitor bracket 21 is fixedly combined to the monitor 20 and the second end thereof is rotatably combined to the first end of the tilting link 30 with a swiveling hinge 50 (to be described later), so that the monitor 20 can swivel relative to the main body 10. Further, the second end of the monitor bracket 21 is formed with a swiveling hinge combining part 23 grooved in correspondence to a first end 50a of the swiveling hinge 50.

According to an embodiment, the tilting link 30 has an "L"-shape, and its first end is rotatably combined to the second end of the monitor bracket 21 with the swiveling hinge 50. Further, the second end of the tilting link 30 is rotatably combined to the first end of the pivoting link 40 with a tilting hinge 60 (to be described later). Therefore, the monitor 20 can be tilted relative to the main body 10. Herein, the first end of the tilting link 30 is formed with a swiveling hinge accommodating part 31 grooved in correspondence to a second end 50b of the swiveling hinge 50, and the second end of the tilting link 30 is formed with a tilting hinge combining part 33 grooved in correspondence to a first end 60a of the tilting hinge 60.

The pivoting link 40 is relatively long, and its first end is rotatably combined to the second end of the tilting link 30 with the tilting hinge 60. Further, the second end of the pivoting link 40 is rotatably combined to the second end of the main body bracket 11 with a pivoting hinge 70 (to be described later). Therefore, the monitor 20 can be pivoted relative to the main body 10. Herein, the first end of the pivoting link 40 is formed with a tilting hinge accommodating part 41 grooved in correspondence to a second end 60b of the tilting hinge 60, and the second end of the pivoting link 40 is formed with a pivoting hinge accommodating part 43 grooved in correspondence to a second end 70b of the pivoting hinge 70.

The first end of the main body bracket 11 is fixedly combined to the main body 10 and the second end of the main body bracket 11 is rotatably combined to the second end of the pivoting link 40 with the pivoting hinge 70, so that the monitor 20 can pivot relative to the main body 10. Further, the second end of the main body bracket 11 is formed with a pivoting hinge combining part 13 grooved in correspondence to a first end 70a of the pivoting hinge 70.

The swiveling hinge 50 includes the first end 50a having a splined cross-section fitted into the swiveling hinge combining part 23 formed in the second end of the monitor bracket 21, so that the swiveling hinge 50 and the monitor bracket 21 rotate as a single body. Further, the second end 50b of the swiveling hinge 50 has a circular cross-section and is inserted in the swiveling hinge accommodating part 31 formed in the first end of the tilting link 30, so that the second end 50b of the swiveling hinge 50 is rotatably combined to the swiveling hinge accommodating part 31 with a predetermined frictional force. Thus, a user can swivel the monitor 20 relative to the main body 10 by employing a force sufficient to overcome the frictional force between the second end 50b of the swiveling hinge 50 and the swiveling hinge accommodating part 31.

Like the swiveling hinge 50, the tilting hinge 60 includes the first end 60a having a splined cross-section fitted into the tilting hinge combining part 33 formed in the second end of the tilting link 30, so that the tilting hinge 60 and the tilting link 30 rotate as a single body. Further, the second end 60b of the tilting hinge 60 has a circular cross-section and is inserted in the tilting hinge accommodating part 41 formed in the first end of the pivoting link 40, so that the second end 60b of the tilting hinge 60 is rotatably combined to the tilting hinge accommodating part 41 with a predetermined frictional force. Thus, a user can tilt the monitor 20 relative to the main body 10 by employing a force sufficient to overcome the frictional force between the second end 60b of the tilting hinge 60 and the tilting hinge accommodating part 41.

Like the swiveling hinge 50 and the tilting hinge 60, the pivoting hinge 70 includes the first end 70a having a splined cross-section fitted into the pivoting hinge combining part 13 formed in the second end of the main body bracket 11, so that the pivoting hinge 70 and the main body bracket 11 rotate as a single body. Further, the second end 70b of the pivoting hinge 70 has a circular cross-section and is inserted in the pivoting hinge accommodating part 43 formed in the second end of the pivoting link 40, so that the second end 70b of the pivoting hinge 70 is rotatably combined to the pivoting hinge accommodating part 43 with a predetermined frictional force. Thus, a user can pivot the monitor 20 relative to the main body 10 by employing a force sufficient to overcome the frictional force between the second end 70b of the pivoting hinge 70 and the pivoting hinge accommodating part 43.

The portable computer according to the first embodiment of the present invention further has a cable 80 to electrically connect the main body 10 and the monitor 20.

The cable 80 is employed for supplying power and transmitting signals from the main body 10 to the monitor 20. The cable 80 is accommodated in the main body bracket 11, the pivoting link 40, the tilting link 30 and the monitor bracket 21. Hence, the main body bracket 11, the pivoting link 40, the tilting link 30, and the monitor bracket 21, respectively, have hollows to accommodate the cable 80. Also, the pivoting hinge 70, the tilting hinge 60, and the swiveling hinge 50, respectively, have hollows to accommodate the cable 80.

With this configuration, the portable computer according to the first embodiment of the present invention operates as follows.

Figure 4:
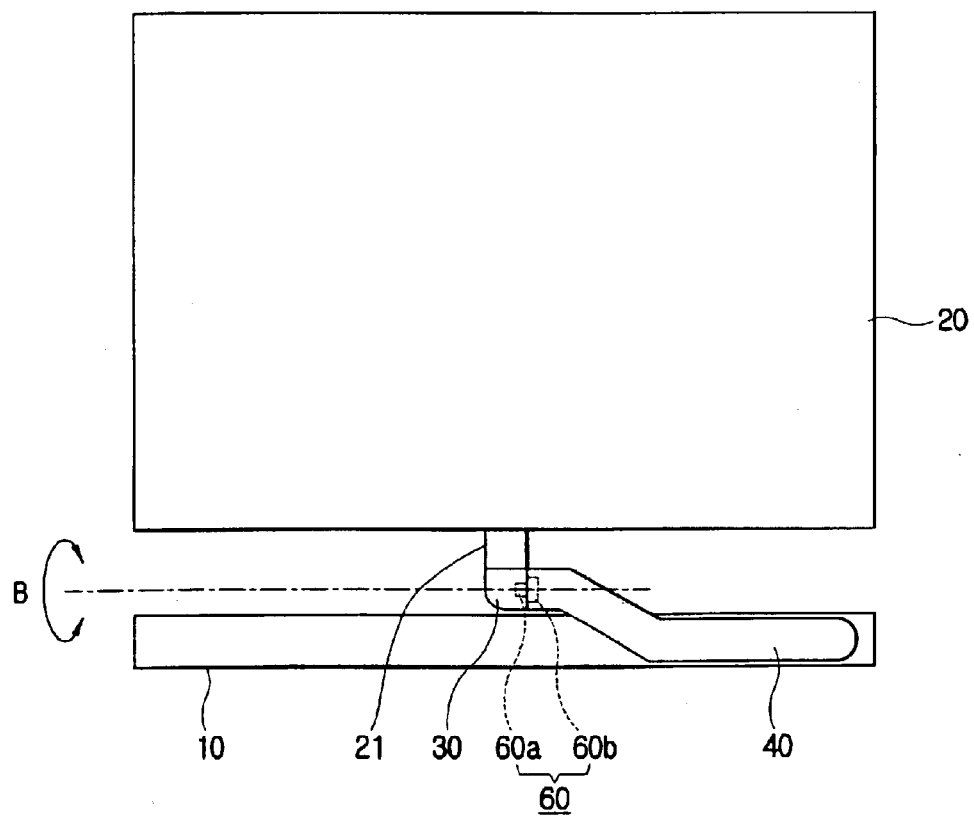
FIG. 4 illustrates the portable computer of FIG. 2, with its monitor being tilted.

Referring to FIG. 4, the monitor 20 can rotate about the tilting hinge 60 forward and backward relative to the main body 10 (refer to the rotation "B" shown in FIG. 4). That is, the monitor 20 can tilt relative to the main body 10.

Figure 5:
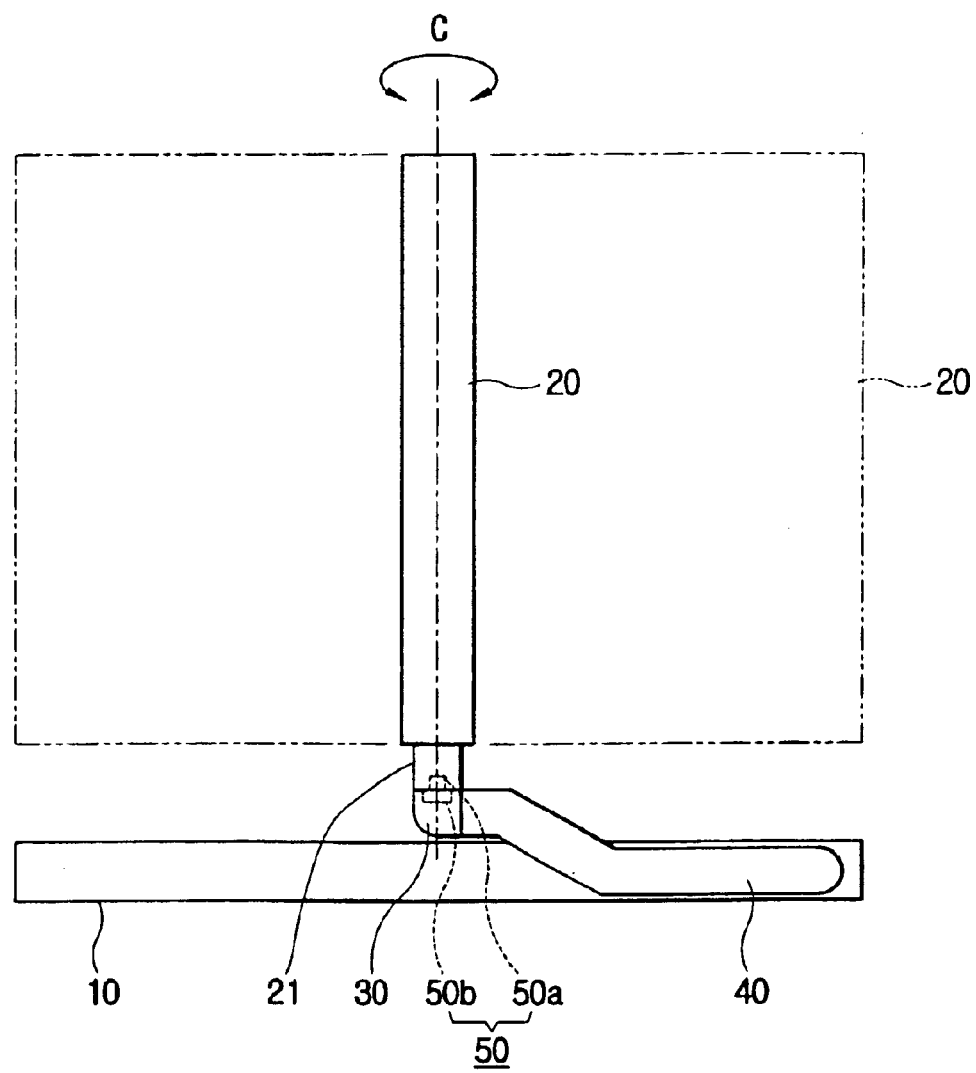
FIG. 5 illustrates the portable computer of FIG. 2, with its monitor being swiveled.

Referring to FIG. 5, after tilting the monitor 20 beyond a predetermined angle, the monitor 20 can rotate about the swiveling hinge 50 left and right relative to the main body 10 (refer to the rotation "C" shown in FIG. 5). That is, the monitor 20 can swivel relative to the main body 10.

Figure 6:
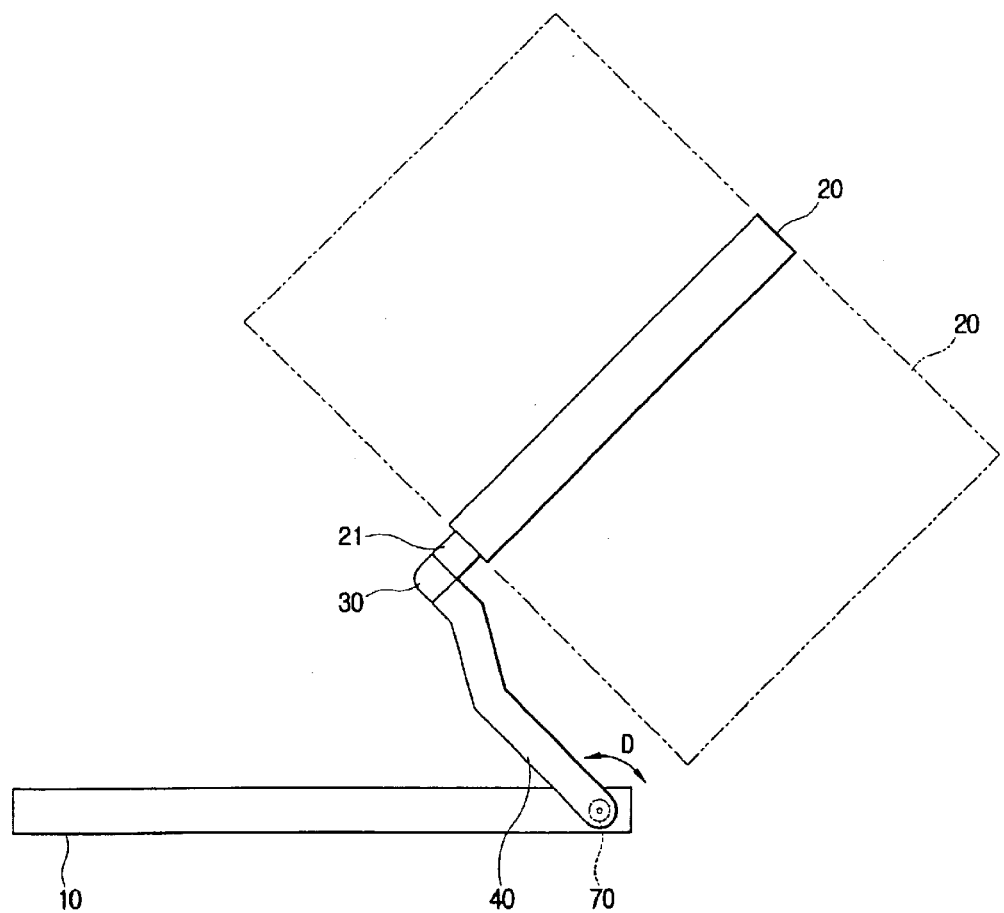
FIG. 6 illustrates the portable computer of FIG. 2, with its monitor being pivoted.

Further, referring to FIG. 6, after tilting the monitor 20 beyond the predetermined angle, the monitor 20 can rotate about the pivoting hinge 70 clockwise and counterclockwise relative to the main body 10 (refer to the rotation "D" shown in FIG. 6). That is, the monitor 20 can pivot relative to the main body 10. Additionally, the monitor 20 can simultaneously swivel and pivot relative to the main body 10 after being tilted beyond the predetermined angle relative to the main body 10.

Thus, the monitor 20 of the portable computer according to the first embodiment of the present invention can be not only tilted, but also swiveled and pivoted relative to the main body 10, so that a user can view the monitor 20 conveniently from various angles without moving the whole portable computer.

Figure 7:
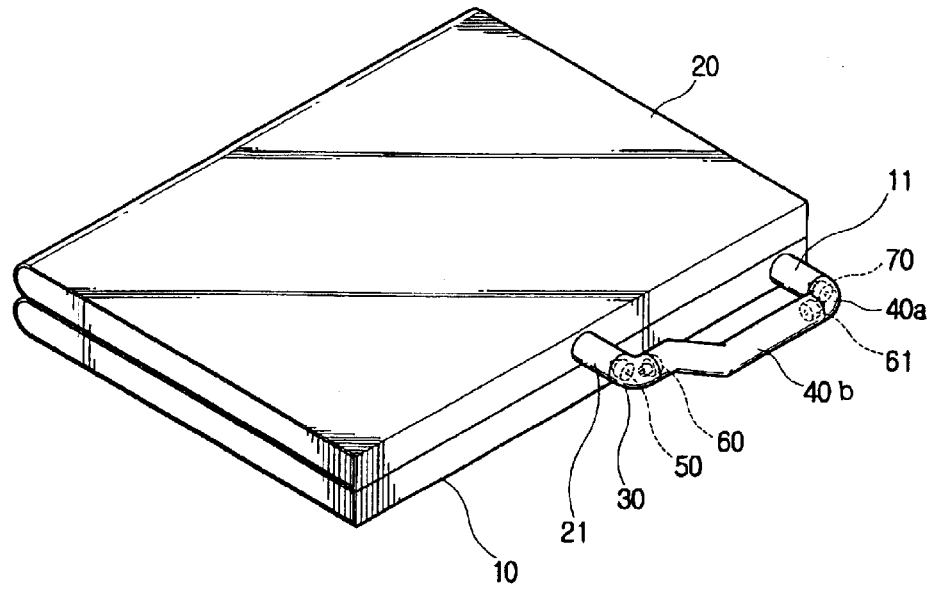
FIG. 7 is a rear perspective view of a portable computer according to a second embodiment of the portable computer.

FIG. 7 is a rear perspective view of a portable computer according to a second embodiment of the present invention. As shown therein, in addition to the first embodiment, a portable computer according to the second embodiment includes an additional tilting hinge 61 connecting first and second pivoting links 40a and 40b.

The additional tilting hinge 61 has the same shape as the tilting hinge 60, and is combined like the tilting hinge 60 to the first and second pivoting links 40a and 40b. Therefore, the monitor 20 can rotate about the additional tilting hinge 61 relative to the main body 10.

With this configuration, the portable computer according to the second embodiment of the present invention also allows the monitor 20 to be minutely tilted relative to the main body 10.

In the foregoing embodiment, the first ends 70a, 60a and 50a of the pivoting, tilting and swiveling hinges 70, 60 and 50 are fitted into the pivoting, tilting and swiveling hinge combining parts 13, 33 and 23, respectively. However, these combinations may be achieved by means of screws, hooks, adhesives, etc., so as to safely prevent a breakaway due to the rotating operations of the monitor 20.

In the foregoing embodiment, the second ends 70b, 60b and 50b of the pivoting, tilting and swiveling hinges 70, 60 and 50 are rotatably combined to the pivoting, tilting and swiveling hinge accommodating parts 43, 41 and 31, respectively. However, these rotatable combinations may be reinforced with screws, hooks, adhesives, etc., so as to prevent a breakaway due to the rotating operations of the monitor 20.

As described above, the second embodiment of the present invention provides a portable computer in which a monitor can be tilted, swiveled, and pivoted relative to a main body, thereby allowing a user to view the monitor from various angles without moving the whole portable computer.

Though the embodiments described relate to a portable computer, it will be appreciated by those skilled in the art that other embodiments such as portable DVD or video players, gaming systems, all in one desktop computers, or other embodiments where a monitor is mechanically coupled to a main body are contemplated.

Although a few embodiments of the present invention have been shown and described, it will be appreciated by those skilled in the art that changes may be made in these embodiments without departing from the principles and spirit of the invention, the scope of which is defined in the accompanying claims and their equivalents.

What is claimed is:

1. A portable computer having a main body and a monitor coupled to the main body, comprising:
    a pivoting link having:
        a first end rotatably combined with the monitor so as to tilt and swivel the monitor relative to the main body; and
        a second end rotatably combined with the main body so as to pivot the monitor relative to the main body.

2. The portable computer according to claim 1, further comprising:
    a tilting link having:
        a first end rotatably combined with the monitor so as to swivel the monitor relative to the main body; and
        a second end rotatably combined with the main body so as to tilt the monitor relative to the main body.

3. The portable computer according to claim 2, further comprising:
    a monitor bracket having:
        a first end combined to the monitor; and
        a second end swivelably combined with the first end of the tilting link.

4. The portable computer according to claim 3, further comprising:
    a main body bracket having:
        a first end combined to the main body; and
        a second end pivotably combined to the second end of the pivoting link.

5. The portable computer according to claim 4, further comprising:
    a swiveling hinge provided between the monitor bracket and the tilting link, and allowing the monitor to swivel relative to the main body.

6. The portable computer according to claim 5, further comprising:
    a tilting hinge provided between the tilting link and the pivoting link, and allowing the monitor to tilt relative to the main body.

7. The portable computer according to claim 6, further comprising:
    a pivoting hinge provided between the pivoting link and the main body bracket, and allowing the monitor to pivot relative to the main body.

8. The portable computer according to claim 7, further comprising:
    a cable to electrically connect the main body and the monitor, the cable being accommodated in the main body bracket, the pivoting link, the tilting link and the monitor bracket.

9. A portable computer, comprising:
    a main body;
    a monitor;
    a member interposed between the main body and the monitor having a first end rotatably combined to the monitor, to tilt and swivel the monitor relative to the main body; and
    a monitor bracket having a first end combined to the monitor and a second end swivelably combined to the first end of the tilting link,
    wherein the first end of the member further comprises a tilting link having:
        a first end rotatably combined with the monitor to swivel the monitor relative to the main body, and
        a second end rotatably combined with the member to tilt the monitor relative to the main body.

10. The portable computer of claim 9, further comprising:
    a swiveling hinge provided between the monitor bracket and the tilting link, to swivel the monitor relative to the main body.

11. The portable computer of claim 10, further comprising:
    a tilting hinge provided between the tilting link and the member, to tilt the monitor relative to the main body.

12. A portable computer, comprising:
    a main body;
    a monitor; and
    a member interposed between the main body and the monitor having a first end rotatably combined with the monitor, to tilt and swivel the monitor relative to the main body, and a second end rotatably combined to the main body to pivot the monitor relative to the main body.

13. The portable computer of claim 12, further comprising:
    a main body bracket having:
        a first end combined to the main body; and
        a second end pivotably combined to the second end of the member.

14. The portable computer of claim 13, further comprising:
    a pivoting hinge provided between the main body bracket and the second end of the member, to pivot the monitor relative to the main body.

15. The portable computer of claim 12, further comprising:

a cable to electrically connect the main body and the monitor, the cable being accommodated in the member.

16. A portable computer, comprising:

a main body;

a monitor;

a pivoting hinge;

a tilting hinge;

a swiveling hinge;

a monitor bracket having a first end combined to the monitor and a second end combined to a first end of the swiveling hinge;

a tilting link having a first end combined to a second end of the swiveling hinge and a second end combined to a first end of the tilting hinge;

a pivoting link having a first end combined to a second end of the tilting hinge and a second end combined to a first end of the pivoting hinge;

a main body bracket having a first end combined to a second end of the pivoting hinge and second end combined to the main body; and a cable to electrically connect the main body and the monitor, the cable being accommodated in the main body bracket, the pivoting hinge, the pivoting link, the tilting hinge, the tilting link, the swiveling hinge, and the monitor bracket.

17. The portable computer of claim 16, wherein:

the second end of the monitor bracket has a swiveling hinge combining part;

the first end of the tilting link has a swiveling hinge accommodating part; and the swiveling hinge comprises:
  a first end having a splined cross-section that is fitted into the swiveling hinge combining part; and
  a second end having a circular cross section that is inserted into the swiveling hinge accommodating part.

18. The portable computer of claim 16, wherein:

the second end of the tilting link has a tilting hinge combining part;

the first end of the pivoting link has a tilting hinge accommodating part; and the tilting hinge comprises:
  a first end having a splined cross-section that is fitted into the tilting hinge combining part; and
  a second end having a circular cross section that is inserted into the tilting hinge accommodating part.

19. The portable computer of claim 16, wherein:

the second end of the main body bracket has a pivoting hinge combining part;

the second end of the pivoting link has a pivoting hinge accommodating part; and the pivoting hinge comprises:
  a first end having a splined cross-section that is fitted into the pivoting hinge combining part; and
  a second end having a circular cross section that is inserted into the pivoting hinge accommodating part.

20. A system to connect a monitor and a main body, comprising:

a member having:
  a first end rotatably combined to the monitor, to tilt and swivel the monitor relative to the main body; and
  a second end rotatably combined to the main body to pivot the monitor relative to the main body.

21. A system to connect a monitor and a main body, comprising:

a member moveably connected with the main body and the monitor, allowing the monitor to move about first through third axes of rotation relative to the main body.

22. The system of claim 21, wherein the monitor is movable about the first, second, and third axes simultaneously.

23. The system of claim 21, wherein monitor is movable about the first, second, and third axes separately.

24. The system of claim 21, wherein:

the first axis is approximately perpendicular to the main body;

the second axis is approximately perpendicular to the first axis; and the third axis is approximately perpendicular to both the second axis and the monitor.

25. A system to connect a monitor and a main body, comprising:

a member moveably connected to the main body and the monitor, allowing the monitor to move about multiple axes of rotation relative to the main body, wherein the multiple axes comprise:

a first axis approximately perpendicular to the main body;

a second axis approximately perpendicular to the first axis;

a third axis that is approximately parallel to the second axis, but not non-linear with the second axis; and a fourth axis approximately perpendicular to the second axis, the third axis, and the monitor.

26. The system of claim 21, wherein the monitor is movable about the first, second, and third axes both simultaneously and separately.

27. A system to connect a monitor and a main body of a portable computer, comprising:

a member moveably connected with the main body and the monitor, enabling rotation of the monitor relative to the main body, about three respectively orthogonal axes of rotation.

* * * * *